United States Patent [19]

Brander

[11] 4,272,591
[45] Jun. 9, 1981

[54] ELECTRONIC APPARATUS WITH BATTERY CHAMBER

[75] Inventor: Richard Brander, Cicero, Ill.

[73] Assignee: Beltone Electronics Corporation, Chicago, Ill.

[21] Appl. No.: 133,917

[22] Filed: Mar. 25, 1980

[51] Int. Cl.³ .......................................... H01M 2/10
[52] U.S. Cl. ...................................... 429/98; 429/100
[58] Field of Search ...................... 429/96, 97, 98, 99, 429/100; 179/107 E, 107 R

[56] References Cited

U.S. PATENT DOCUMENTS

| 3,736,741 | 6/1973 | Paratti | 429/98 |
| 4,072,800 | 2/1978 | Gammer | 429/98 |
| 4,153,758 | 5/1979 | Cerny | 429/98 |
| 4,206,274 | 6/1980 | Peels | 429/99 |

Primary Examiner—Charles F. LeFevour

Attorney, Agent, or Firm—Allegretti, Newitt, Witcoff & McAndrews

[57] ABSTRACT

An improved battery door structure is provided which has advantageous use in compact electronic apparatus, as for example a hearing aid, electronic watch, miniature calculator and other types of small battery operated devices. The structure includes a body member including a power source, such as a small battery. The structure is provided with a battery receptacle which has a hinged door, which may be opened and closed at will from the outside of the body member. In one preferred embodiment, the body member may be readily removable and replaceable from the remainder of the structure. The body member as a unit is provided with plastic members forming plastic hinge means for the battery door. The battery door includes hinge pivot pin means wherein the door and hinge pivot means preferably are molded as one piece.

5 Claims, 7 Drawing Figures

ELECTRONIC APPARATUS WITH BATTERY CHAMBER

BACKGROUND OF THE INVENTION

There are many types of compact, battery operated electronic devices which utilize hinged, manually operated, battery access doors. In order to illustrate the novel and highly advantageous features of the present invention, it will be described with respect to a hearing aid, although it will be understood that the novel battery door construction is useful with many different types of compact electronic apparatus.

The basic components of a hearing aid include a receiver, a battery, an amplifier, a gain control and a microphone. In some of the "in-the-ear" hearing aids in the prior art, these components have been supported in a plastic housing which is removably inserted and retained in a plastic structure molded to the contour of the wearer's ear. The housing has included a small hinged door which is snapped open or shut so that the user may insert or remove the battery without disassembling any parts from the hearing aid.

Prior United States patents broadly showing hearing aids with battery access means include Webber et al, U.S. Pat. Nos. 2,987,584; Leale, 3,170,046 and Hickox, 3,598,928. However, none of the aforementioned patents discloses a door for the battery recess wherein the door and the hinge member therefor are formed completely of plastic material and which hinge members may be assembled and disassembled very easily by snapping the cooperating parts thereof into and out of retaining position.

Also, former constructions have utilized hinged battery access doors wherein a metal hinge pin has been utilized. However, a deficiency associated with metal hinge pins lies with the weakness of the plastic member on the battery door which engages the pin. In addition, metal hinge pins require a difficult insert molding process which increases unit cost.

Accordingly, it is desirable to provide, in compact electronic apparatus, an improved battery access door which is inexpensive, durable, easy to operate, and is readily assembled and disassembled.

SUMMARY OF THE INVENTION

In its principle aspect, the present invention relates to an improved structure of the door for closing the opening for the battery in a miniature electronic structure.

DETAILED DESCRIPTION OF THE PREFERRED EMBODIMENT

Figure 1:
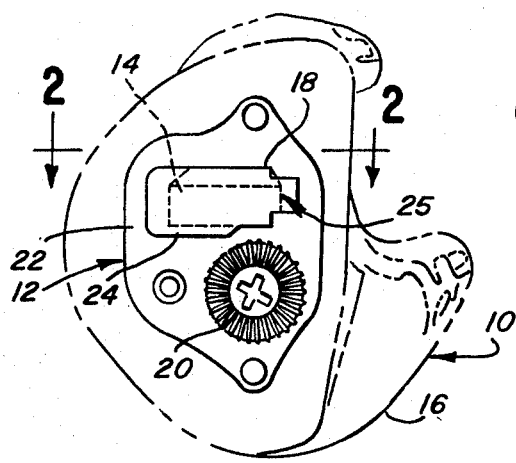
FIG. 1 is a side elevational view of one illustrative embodiment of the invention comparing a miniature hearing aid having a removable body member with the removable body member including the battery door shown in solid lines and the remainder of the ear-insertable portion of the hearing aid shown in dotted lines.
Figure 4:
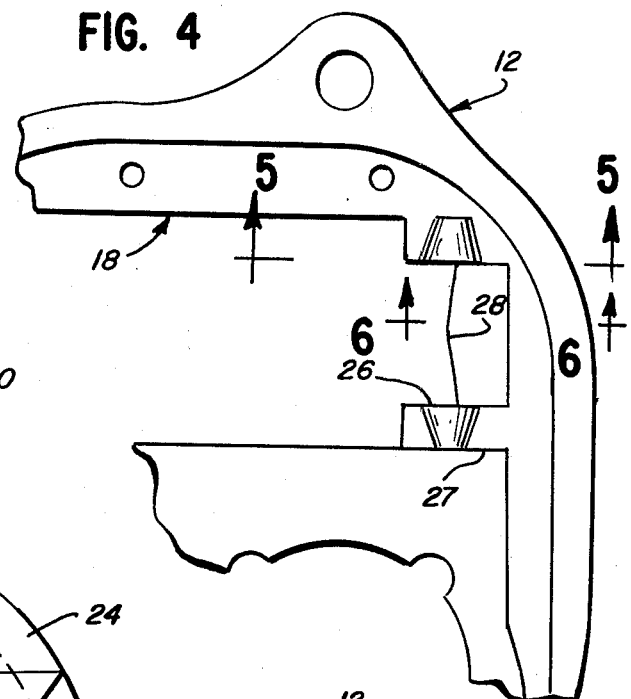
FIG. 4 is a view of a portion of the hearing aid body member showing the hinge supports for the battery door and the battery door opening.
Figure 2:
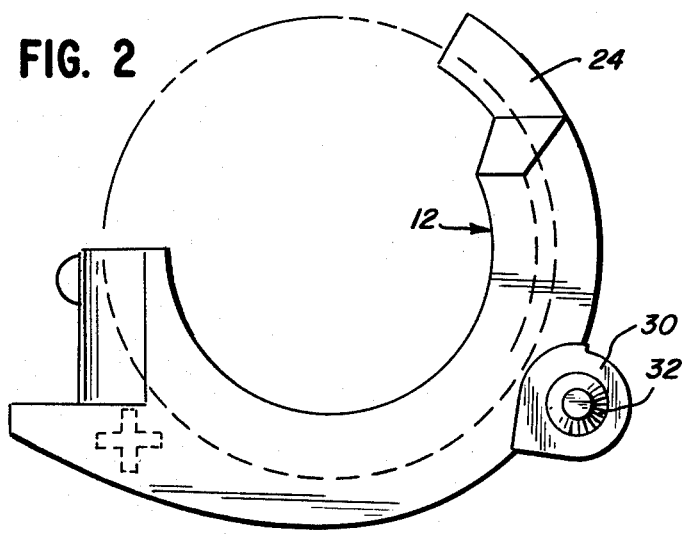
FIG. 2 is a sectional view taken on line 2—2 of FIG 1.
Figure 5:
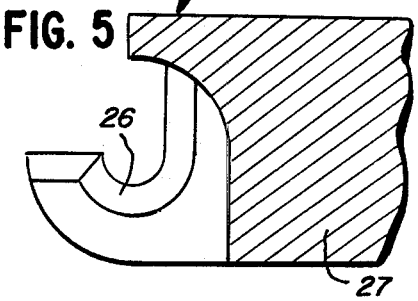
FIG. 5 is a sectional view taken on line 5—5 of FIG. 4.
Figure 6:
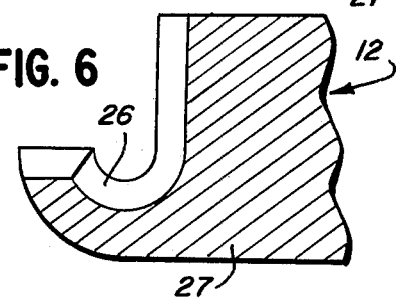
FIG. 6 is a sectional view taken on line 6—6 of FIG. 4.
Figure 3:
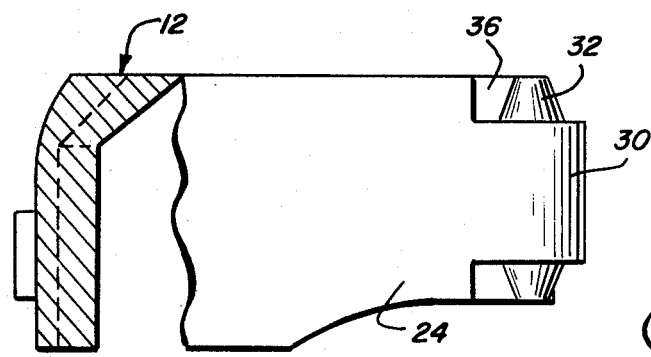
FIG. 3 is a view of the battery door and hinge therefor, partly shown in section.
Figure 7:
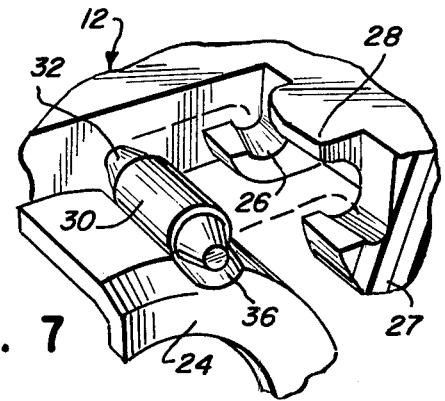
FIG. 7 is a partial perspective view of the portion of the battery closure door and the hinges therefor, shown prior to assembly.

As illustrated in FIG. 1, a miniature hearing aid structure 10, which is to be placed in a person's ear, is shown with a body member or panel 12 carrying a battery 14 and other parts shown in solid lines and a custom formed ear insert 16 shown in dot and dash lines. The body member 12 includes a battery compartment 18 and an adjustable volume control 20 mounted on the exterior surface 22 of the body member 12 facing outwardly from the wearer. A conventional amplifier circuit (not shown) is also mounted on the body member 12.

A hinged door 24, preferably formed of plastic, is provided to close the opening 18 when the hearing aid is in normal use and is hinged as shown generally at 25 so that the door may be swung open and closed to remove and replace a battery when desired. The body member 12 and door including the hinge structure preferably are all formed of molded plastic material, such as acrylic or the like.

Numeral 26 indicates tapered semi-circular grooves formed in a wall 27 of the body member 12 by the molding process and numeral 28 indicates an extension from the wall 27 which is disposed between two tapered grooves 26, to provide for reception of tapered ends 32 of a cylindrical hinge pin 30. The door 24 is provided with a semi-circular depression 36 in which the hinge pin 30 is disposed, so that the door 24 may rotate about the pin 30 after it has been snapped into the grooves 26, which is possible because of the resiliency of the plastic material of which the entire assembly 12 is formed.

Normally the door 24 is closed as shown in FIG. 1. However, if the user desires to gain access to the battery compartment 18, the door 24 may be readily opened by the finger of the wearer to rotate it about the pin 30 so that the small battery may be inserted, removed and replaced in the battery compartment 18.

The construction described above is a distinct improvement over previous hinges which used a molded-in metal pin which extended across the back of the battery door opening. With the advent of much smaller batteries now available, the width of the hinge portion became very narrow and too weak to use with a metal pin, since it lacked rigidity and sometimes pulled out of the assembly and caused the door to fall off. There therefore is a need for an improved small battery door having a more rigid construction which also eliminates metal insert pins with their attendant expense and lack of dependability. The present invention provides for the use of a very small door for the smaller batteries, and also eliminates the unreliable and relatively expensive molded-in metal pin of the previous constructions. One distinct advantage of the invention is the fact that the hinge pin and battery door can be molded as one plastic piece, rather than as a separate metal pin and plastic housing as exemplified by the prior art. The door construction of the present invention with its hinge means is insertable after the remainder of the unit is assembled and is field replaceable if, for any reason, the door or its hinge breaks.

From the foregoing it will be apparent that an improved door construction has been provided for compact, battery powered, electronic apparatus which is inexpensive to manufacture and easy to assemble and disassemble.

Various modifications may be made in the form of the invention without departing from the principles disclosed in the foregoing. It is my intention therefore that the accompanying claims be construed as broadly as possible consistent with the prior art.

What is claimed is:

1. Compact electronic apparatus including a molded plastic body member, a chamber in said body member for receiving a battery and a door for opening and closing the battery chamber, hinge means provided at one side of said door; said hinge means comprising hinge pin means formed of plastic material, and plastic hinge pin support members for the hinge pin means formed in the plastic material of said body member at opposite sides of said chamber and being dimensioned with respect to the hinge pin means so that the hinge pin means may be snapped into the support members due to the resiliency of the plastic material from which they are formed.

2. Compact electronic apparatus as claimed in claim 1 wherein the plastic hinge pin support members are tapered grooves formed in the main body member.

3. Compact electronic apparatus as claimed in claim 1 and wherein said hinge pin means is cylindrical at its center and includes tapered cylindrical members adapted to be engaged in said tapered grooves by a snap fit.

4. Compact electronic apparatus as claimed in claim 1 wherein all the plastic parts are formed of the same plastic material.

5. Compact electronic apparatus as claimed in claim 1 wherein said hinge pin means and said door are formed as one unitary plastic member.

* * * * *